Jan. 12, 1926.　　　　　　　　　　　　　　　　　　1,569,032
H. REICHEL
SHINGLE CUTTER
Filed August 24, 1923　　　8 Sheets-Sheet 7
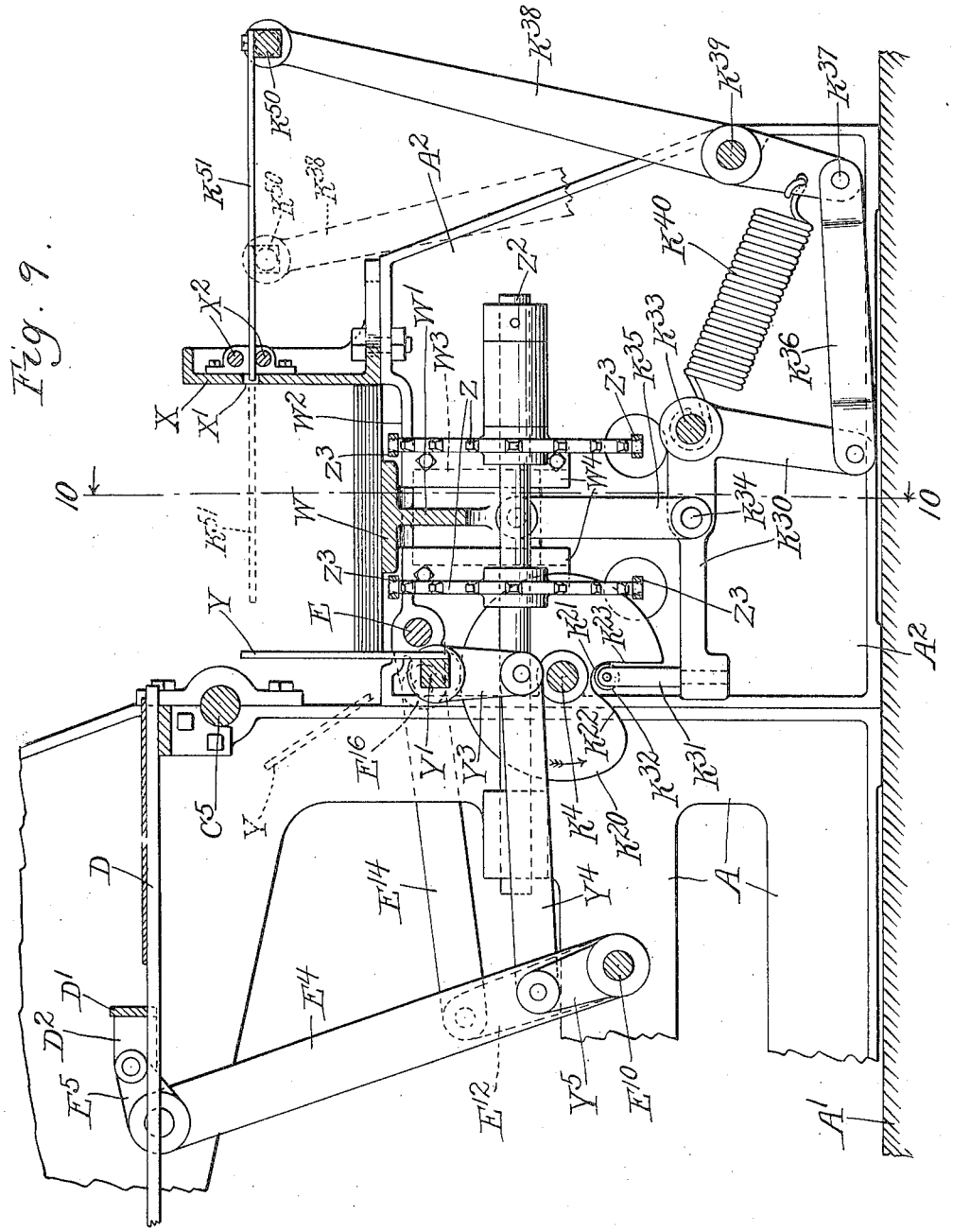
Inventor.
Hugo Reichel.
by Parker + Carter
Attorneys

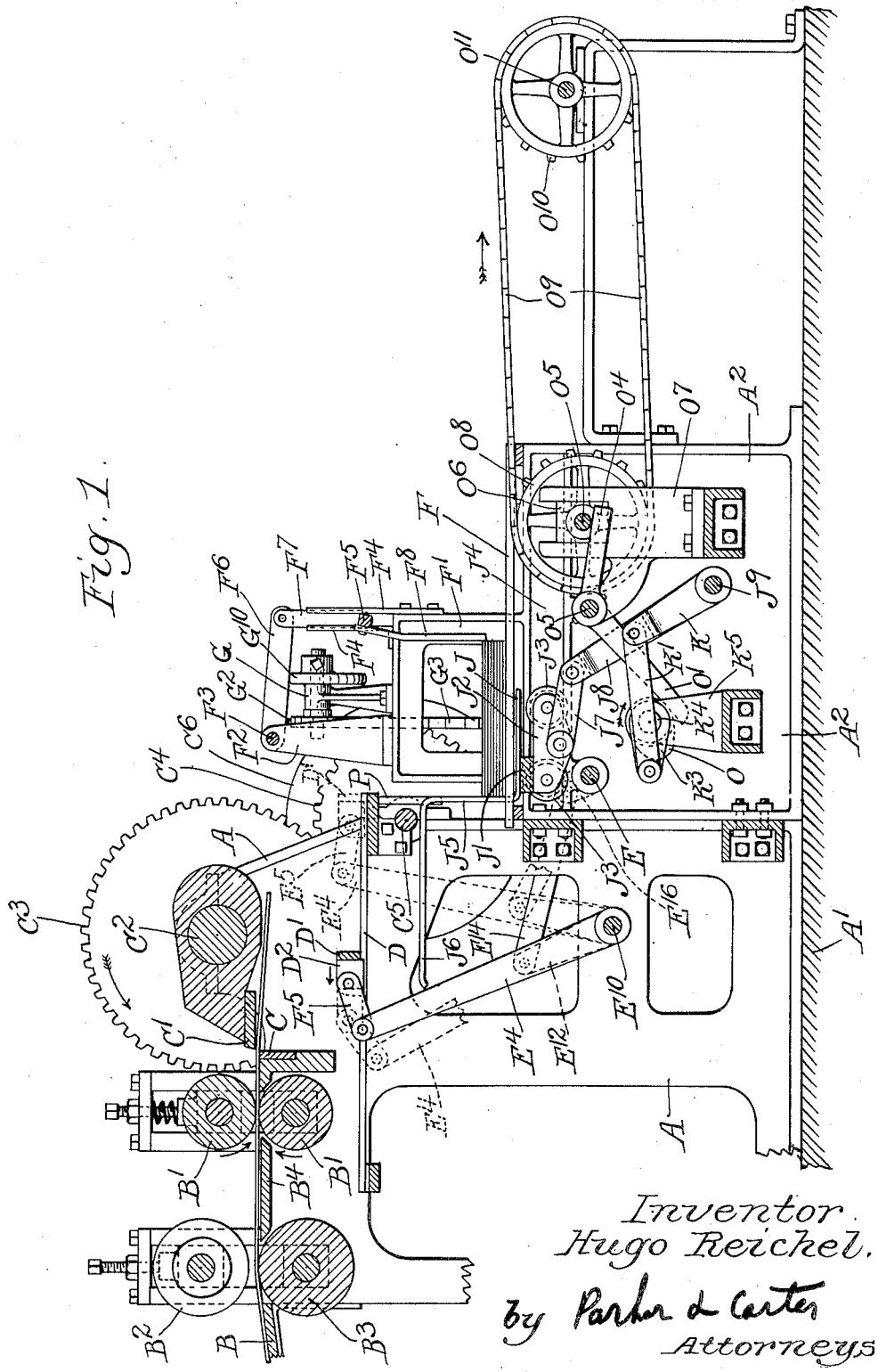

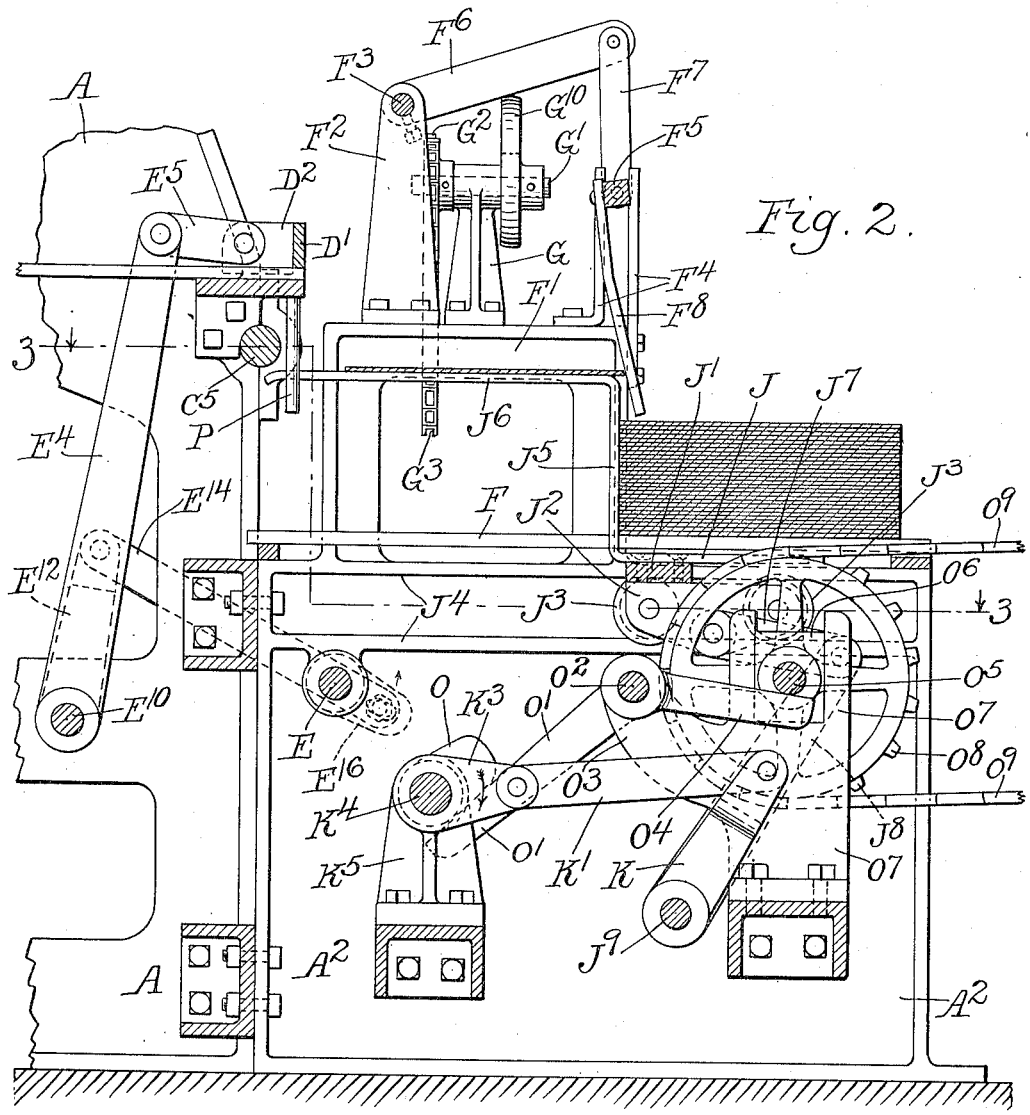

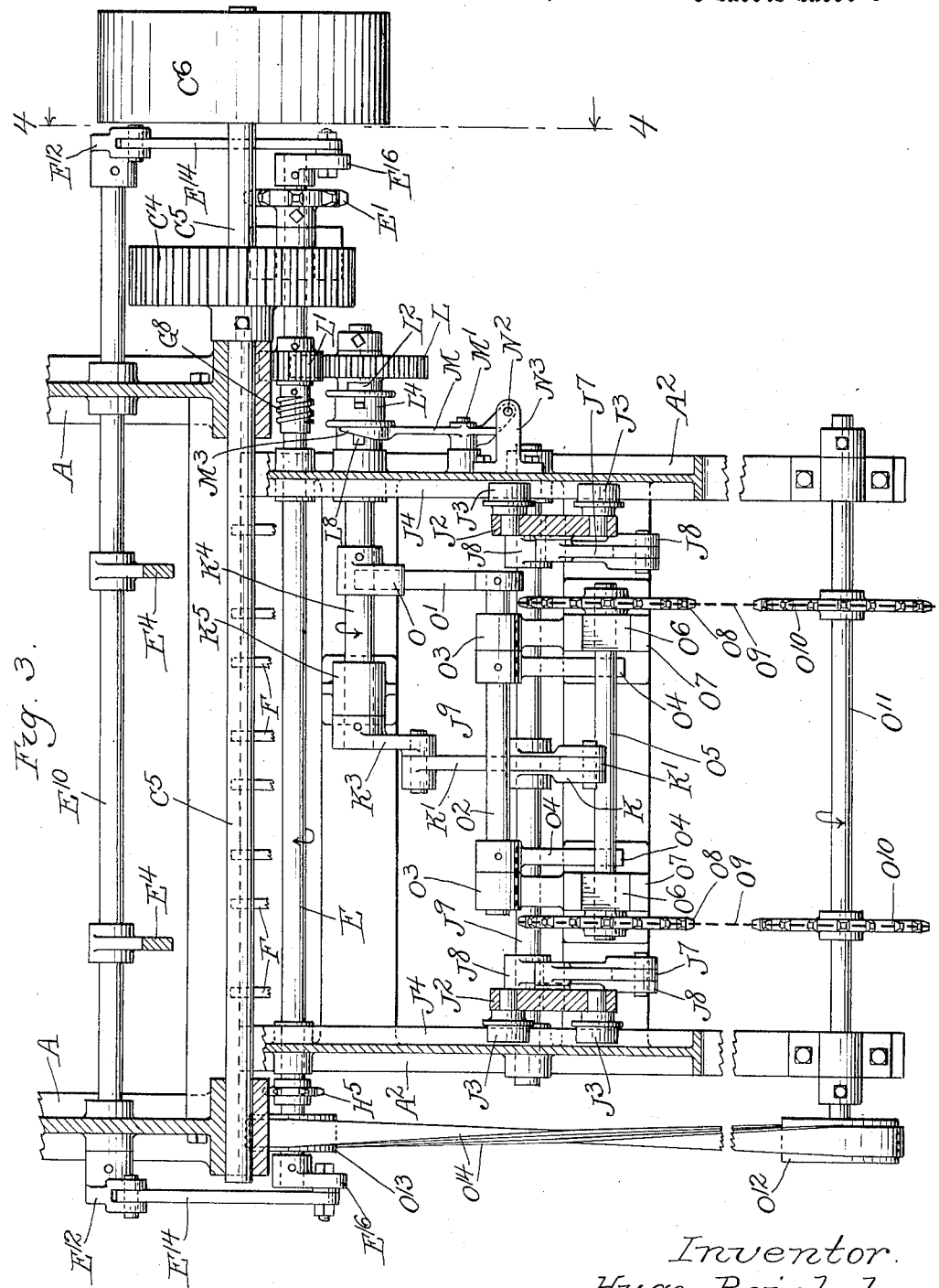

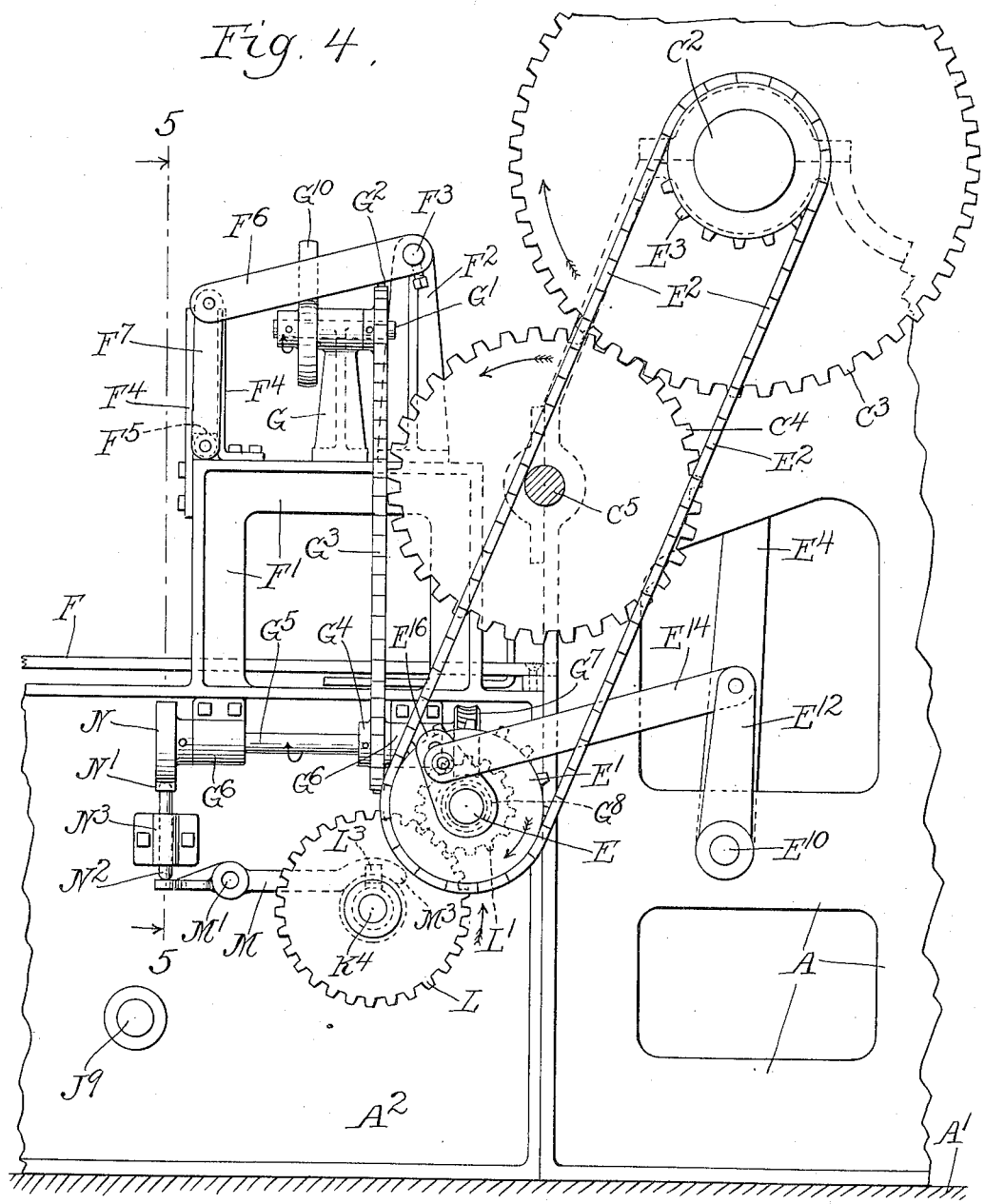

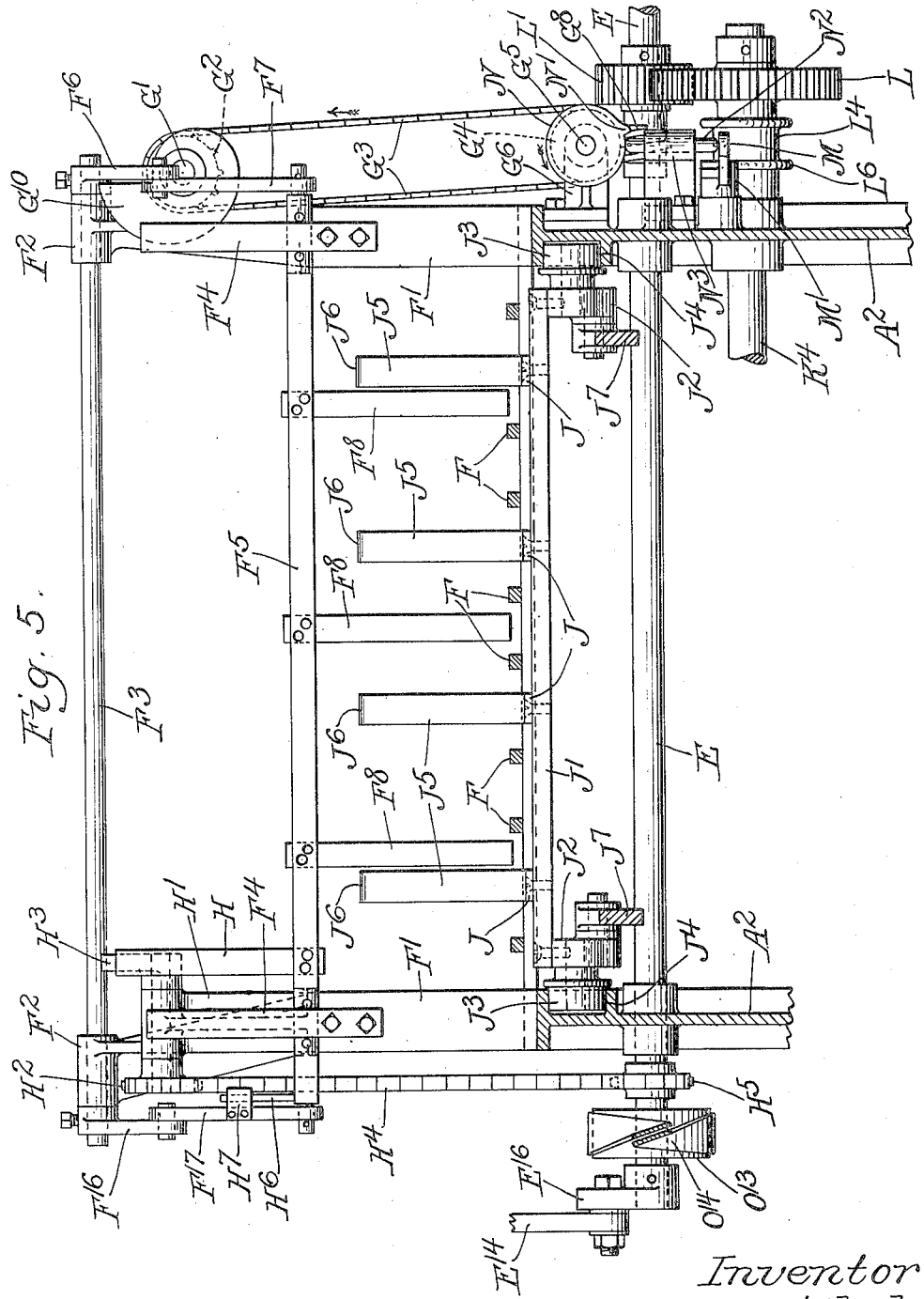

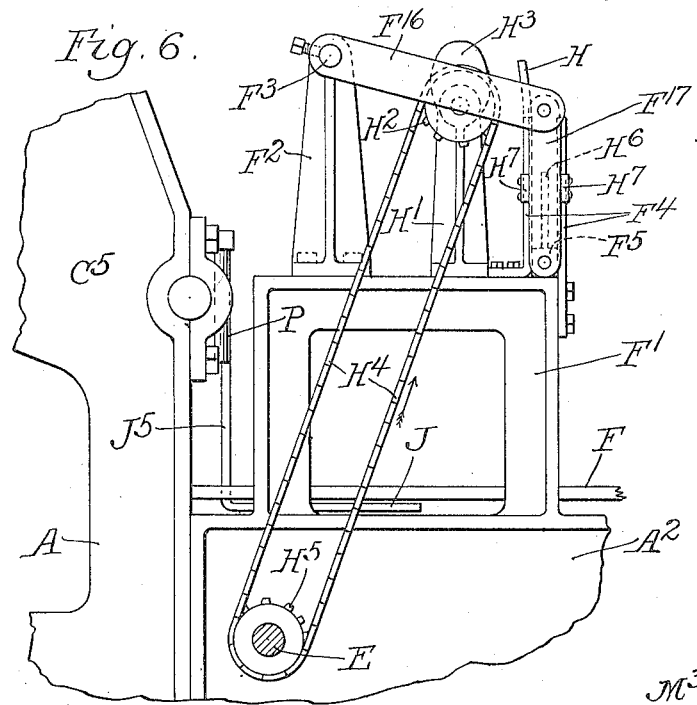
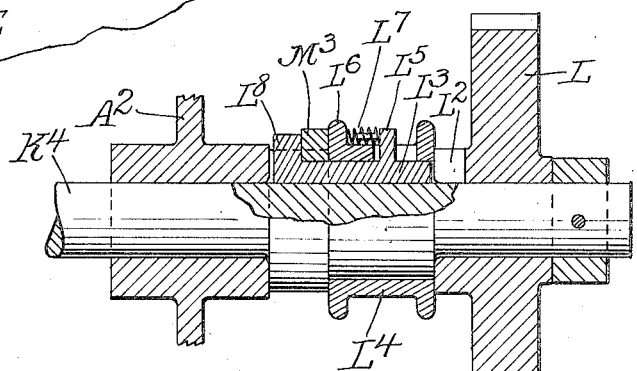
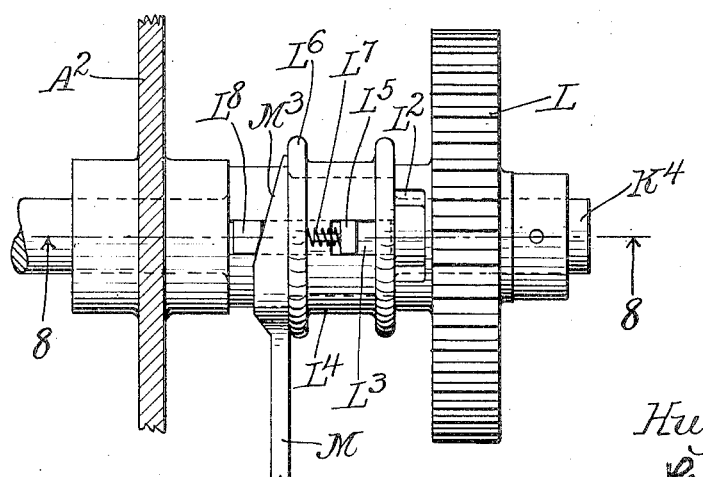

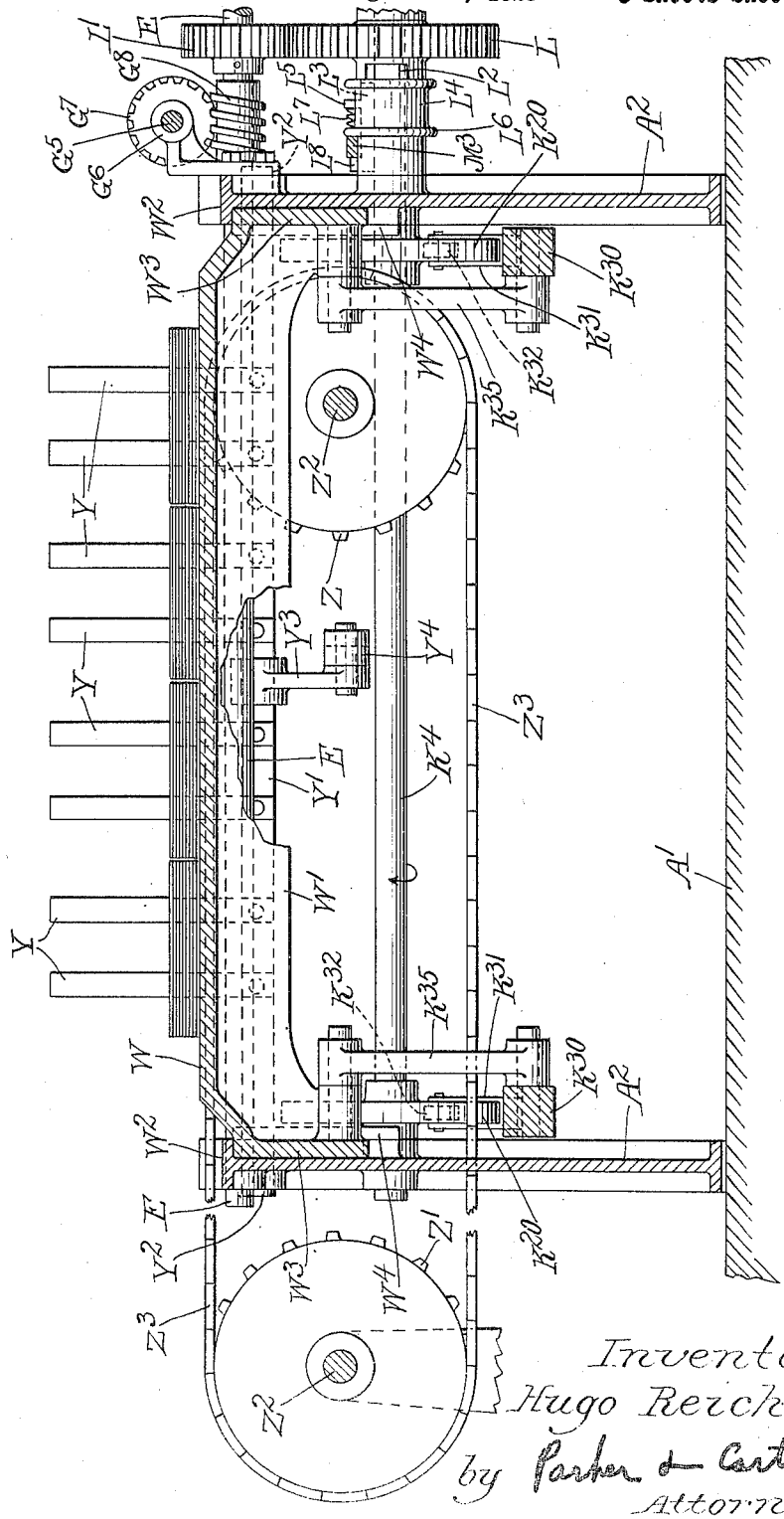

Patented Jan. 12, 1926.

1,569,032

UNITED STATES PATENT OFFICE.

HUGO REICHEL, OF CHICAGO, ILLINOIS.

SHINGLE CUTTER.

Application filed August 24, 1923. Serial No. 659,055.

*To all whom it may concern:*

Be it known that I, HUGO REICHEL, a citizen of the United States, residing at Chicago, in the county of Cook and State of Illinois, have invented a certain new and useful Improvement in Shingle Cutters, of which the following is a specification.

My invention relates to a machine for stacking shingles and particularly to a machine which receives the shingles as they are cut from a roll of shingle making material, permits their accumulation in piles or bundles of a given size or weight, and discharges the bundle when it reaches its predetermined size. Other objects will appear from time to time in the course of the specification and claims.

I illustrate my invention more or less diagrammatically in the accompanying drawings, wherein:

Figure 1 is a longitudinal section through one form of my machine;

Figure 2 is a view similar to Figure 1 showing the parts in the bundle discharge position with the conveying element about to be raised to carry the bundle away;

Figure 3 is a section on the line 3—3 of Figure 2;

Figure 4 is an elevation of the driving side of the part of the machine shown in Figure 2 with parts restored to starting position;

Figure 5 is a section along the line 5—5 of Figure 4, most of the parts being shown in elevation;

Figure 6 is a detail side elevation of the end of the machine opposite to that shown in Figure 4;

Figure 7 is a clutch detail;

Figure 8 is a section on the line 8—8 of Figure 7;

Figure 9 is a longitudinal section through another form of the device; and

Figure 10 is a section on the line 10—10 of Figure 9.

Like parts are illustrated by like characters throughout the drawings and specifications.

A is a shingle cutting machine frame suitably supported upon and secured to the base or floor $A^1$. Secured to the same base and also to the frame A is the stacking machine frame $A^2$ which, for example in Figure 1, is shown as separate from but secured to the frame of the shingle cutting machine.

B is a supporting and feeding table across which is fed a roll or strip of material from which shingles may be formed. $B^1$, $B^1$ are feeding rollers. $B^2$ is a cutting roller shown in Figure 1 as raised or in inoperative position, and $B^3$ is a supporting roller in opposition to the cutting roller. $B^4$ is an intermediate support between the rollers $B^1$ and $B^3$.

C is any suitable cutting edge or blade which is shaped in accordance with the desired shape of the shingle to be produced. $C^1$ is an opposed rotary blade mounted upon the shaft $C^2$ to which shaft is keyed the gear $C^3$ which meshes with the gear $C^4$ on the drive shaft $C^5$. $C^6$ is the drive pulley.

Each rotation of the blade $C^1$ shears off a shingle section which drops on the receiving bars or table D of the frame A, being thrown somewhat forwardly toward the right, as shown in Figure 1 by the rotation of the blade $C^1$. $D^1$ is a discharge arm which is mounted at either end in blocks $D^2$ and adapted to reciprocate back and forth across the surface D, being actuated as below described.

E is a shaft constantly driven through the sprocket $E^1$ and the chain $E^2$ and the sprocket $E^3$ from the cutter shaft $C^2$, the sprockets $E^1$ and $E^3$ being of the same size and the rate of rotation of the two shafts E and $C^2$ being the same. $E^4$, $E^4$ are cranks keyed to each end of the shaft $E^{10}$ to the upper end of which are pivoted links $E^5$ which in turn are pivoted to the blocks $D^2$ of the bars $D^1$. $E^{12}$, $E^{12}$ are crank arms fastened to the ends of the shaft $E^{10}$, to the upper end of which are pivoted the links $E^{14}$, the opposite ends of which in turn are pivoted to the cranks $E^{16}$ on the shaft E. The relative proportion of parts is such that when the blades C and $C^1$ are in opposition the bar $D^1$ is in the position shown in full lines in Figure 1. As the blade $C^1$ rotates downwardly past the cutting point, the bar $D^1$ and its adjacent parts move back to the left to the position shown in dotted lines in Figure 1, before starting their forward excursion which terminates in the position shown in dotted lines farther to the right of the same figure.

F is a table or surface comprising a plurality of fixed shingle supporting bars upon which the shingles are adapted to drop as they are swept from the edge of the platform D by the reciprocation of the bar $D^1$. These bars extend longitudinally from the frame A and are supported in any suitable manner on the frame $A^2$. At each side of the platform F is a bracket or supporting frame $F^1$, each one having an upstanding bracket $F^2$, $F^2$ across the top of which rocks the shaft $F^3$. Mounted on the opposite corner of each of said brackets $F^1$ are a pair of guide fingers $F^4$, $F^4$ which serve as a track to guide the transverse bar $F^5$. Keyed adjacent each end of said shaft $F^3$ are levers $F^6$, $F^{16}$ to the outer ends of which are pivoted the links $F^7$, $F^{17}$ which are secured to the bar $F^5$. The bar $F^5$ is provided with a plurality of tapping fingers $F^8$, the operation of which will later be described.

G is a bracket upwardly extending from one of said supports $F^1$. Mounted therein is a short shaft $G^1$ which is driven through the sprocket $G^2$ and the chain $G^3$ from the sprocket $G^4$ on the short shaft $G^5$ which rotates in the bearings $G^6$, $G^6$. Said shaft $G^5$ has at one end a worm wheel $G^7$ in mesh with a worm $G^8$ intermediate the ends of the shaft E. The shaft $G^1$ is thereby driven from the shaft E at a substantially lower rate of rotation which might be, for example 1 to 25. At the opposite end of the shaft $G^1$ from the sprocket $G^2$ is the cam $G^{10}$ which is adapted to engage and lift the link $F^6$ and thereby rotate the shaft $F^3$ and thus lift each end of the bar $F^5$. When the cam reaches the position shown in Figure 5, the link $F^6$ is released and drops the bar $F^5$ which is guided in its downward path by the previously mentioned fingers $F^4$, the bar $F^5$ being lifted during, for example 25 rotations of the shaft E to be dropped again to its original position.

H is an arm upwardly projecting from the bar $F^5$ at the opposite end of said bar from the lifting cam above described. In alignment with it is a bracket $H^1$ on the support $F^1$ in which is mounted a short shaft having at one end the sprocket $H^2$ and at the other the cam $H^3$ which is adapted to engage the arm H at each revolution; through the sprocket $H^2$, the chain $H^4$, it is driven from the sprocket $H^5$ on the shaft E, the size of the parts being such that the cam $H^3$ rotates at the same rate as the said shaft E. To limit the oscillation imparted by the contact with the cam $H^3$ with the upwardly projecting arm H, I provide a pin $H^6$ upwardly projecting from the bar $F^5$ which is adapted to contact the limit abutments $H^7$ mounted on either side of the link $F^{17}$.

As shown in Figure 1, the fingers $F^8$ contact the edge of the cut shingle as it is discharged from the cutting surface D. The tapping action imparted by the cam $H^3$ keeps each shingle aligned with the whole shingle pile. I provide an aligning support comprising a plurality of bars J secured to a cross bar $J^1$ which is mounted at each end upon a carriage $J^2$ provided with wheels $J^3$ which ride in any suitable track $J^4$. The bars J are formed in three sections, namely, a longitudinal section adjacent their securing point to the bar $J^1$, a vertical section $J^5$ and an upper horizontal section $J^6$ projecting inwardly therefrom and normally projecting in beneath the shingle receiving bars or table D. The carriages $J^2$ may be propelled along the tracks $J^4$ by means of the link $J^7$ pivoted to the upper end of the lever $J^8$, the lower end of which is keyed to a rock shaft $J^9$.

Said shaft is intermittently actuated by the lever arm K to the upper end of which is pivoted the link $K^1$, the opposite end of which is pivoted to the crank $K^3$ on the clutch shaft $K^4$ which is mounted in the bearing $K^5$ at the crank end and near the opposite end in one of the frame members $A^2$.

Loosely mounted thereon is the constantly rotating gear L which meshes with the pinion $L^1$ on the shaft E. It is provided at one side with a bolt receiving aperture $L^2$. $L^3$ is a bolt slidably mounted in a clutch element $L^4$. It is provided with a stud $L^5$ between which and one rim $L^6$ of the said clutch band $L^4$ is compressed a spiral spring $L^7$ which is adapted to thrust the bolt $L^3$ into the bolt aperture $L^2$.

M is a lever pivoted intermediate its ends, as at $M^1$, its longer section adapted normally to rest upon the bolt $L^3$ between its upstanding end $L^8$ and the rim $L^6$ and terminating in a wedge surface $M^3$. As shown in Figures 7 and 8 it resists the spring $L^7$ and holds the bolt $L^3$ out of contact with the gear L which then rotates freely on the shaft $K^4$.

Upon the end of the shaft $G^5$ opposite to the worm $G^7$ is mounted a cam disc N having a single cam element or projection $N^1$ at one point in its circumference. $N^2$ is a pin mounted in the bearings $N^3$ and adapted to contact the shorter end of the lever M. During each rotation of the shaft $G^5$ the cam element $N^1$ depresses, the pin $N^2$ presses down the shorter end of the lever M, lifts the long end and thus releases the bolt $L^3$, permitting the gear L to rotate the shaft $K^4$. At the completion of said rotation the wedge end $M^3$ of the lever M again drops into position and withdraws the bolt $L^2$ into inoperative position.

The shaft $K^4$ also carries a second cam O which is adapted to contact the lower end of the lever $O^1$ fastened on the rock shaft $O^2$. The rock shaft $O^2$ is supported in bearings $O^3$, $O^3$ and has the two lever arms $O^4$, $O^4$, the outer ends of which underlie the sprocket shaft $O^5$ which is mounted in slide blocks $O^6$, $O^6$ to slide in the vertical guides $O^7$. Any suitable number of sprockets $O^8$, $O^8$ may be mounted on said shaft $O^5$, each carrying chains $O^9$ which pass about the terminal sprocket or sprockets $O^{10}$, it being understood that the sprockets $O^8$ and the inner end of the chains are normally beneath the surface of the fixed supporting bars F and are aligned with the spaces between said bars. The shaft $O^{11}$ upon which the outer sprockets $O^{10}$ are mounted is driven through the pulley $O^{12}$ from the pulley $O^{13}$ on the shaft E by means of the belt $O^{14}$.

P, P are stop bars or pins downwardly projecting from the edge of the receiving surface D to the point beneath the upper horizontal sections $J^6$ of the bars J.

In the form shown in Figures 9 and 10 the shingles as they are discharged from over the edge of the receiving surface D by means of the bar $D^1$, drop upon a table element W, which is shown as having a downwardly projecting reinforcing rib $W^1$. The top of the table W normally stands above the depressed portions $W^2$ of the frames $A^2$. Extending over the space between and secured to said frames along the outer edge of said depressed portions is the laterally adjustable stop plate X which is slotted or perforated along the horizontal line as at $X^1$ behind which slot are the rollers $X^2$, $X^2$, the purpose of which will later appear. As the shingles drop upon the plate W, they are tapped over against the fixed stop plate X by means of the vibrating arms Y in which are mounted the square shaft $Y^1$, the rounded ends of which $Y^2$ are rotatably mounted in any suitable bearings in the frame $A^2$. The vibrating arms Y are driven with the bar $D^1$ by means of the crank shaft $Y^3$, the link $Y^4$ and finally the crank shaft $Y^5$ which is keyed to the shaft $E^{10}$.

Z, $Z^1$ are pairs of sprockets mounted on sprocket shafts $Z^2$ driven in any suitable manner and supported by any suitable bearings. $Z^3$ are chains passing over said sprockets, the upper reaches of said chains being normally somewhat below the top of the table W. The table W is mounted between said sprocket chains and is provided at each end with downwardly depending guides $W^3$ adapted to slide in any suitable guides $W^4$. Mounted on the clutch shaft $K^4$ earlier described in connection with the other form of my invention is a cam disk $K^{20}$ provided with a cam depression $K^{21}$ having one inclined wall $K^{22}$ and one substantially radial wall $K^{23}$. The clutch shaft $K^4$ is driven as earlier described. In opposition to said cam $K^{20}$ is a bell crank lever $K^{30}$ having a pin $K^{31}$ with a roller $K^{32}$, as shown in Figure 9, the roller being adapted to engage the periphery of the cam disc. The bell crank lever is pivoted as at $K^{33}$. Intermediate its upper arm as at $K^{34}$ is pivoted the link $K^{35}$, the upper end of which is pivoted upon one of the slides $W^3$ of the table W. To the end of the lower arm of said bell crank lever is pivoted the link $K^{36}$, the opposite end of which is pivoted, as at $K^{37}$ to the lever $K^{38}$, which in turn is pivoted as at $K^{39}$ in the frame $A^2$. The spring $K^{40}$ serves to keep the lever $K^{30}$ normally in the position shown in full lines in Figure 9. Pivoted to the upper end of the lever $K^{38}$ is the bar $K^{50}$ upon which are mounted supporting fingers $K^{51}$ which pass through the openings $X^1$ and engage the rollers $X^2$.

The use and operation of my invention are as follows:

I have developed a stacker for stacking shingles after they are cut from the roll or strip of shingle forming material, the nature of the material being immaterial. The strip is fed forward beneath the cutting rolls which may divide it into a number of narrow strips in case smaller shingles are desired. The feed rolls $B^1$ feed the strip across the cutting edge C where the rotary blade shears off the projecting end of the strip to make a shingle. As the blade rotates it throws the shingle somewhat forwardly upon the receiving surface D and the bar $D^1$ meanwhile travels slightly to the rear to reach the position shown in dotted lines at the left of Figure 1. It then moves forward and pushes the shingle off the receiving surface D and then upon the receiving bars F. The oscillating fingers tap it back into position against the vertical portion $J^5$ of the bars J, earlier described, thus aligning the stack. The mechanism operating the tapping fingers is timed to the cutting drive so that each shingle is tapped back into position. Meanwhile the cam $G^{10}$ is slowly lifting the bar $F^5$ and with it the tapping fingers, so that they are constantly maintained at the correct height for the successively delivered shingles. When a pre-determined number of shingles have been sheared off and delivered to the growing stack the clutch mechanism shown in Figures 7 and 8 operates, the shaft $K^4$ rotates and through the link $K^1$ and the crank K in turn rotates the pivot $J^9$ which through the crank $J^8$ and the link $J^7$ moves the carriage $J^2$ to the right, as shown in Figure 2. As the carriage moves, the bars or rods which upwardly project as at $J^5$ through the supporting surface carry with them the completed stack and the horizontal portion $J^6$ serves to receive the shingle or shingles which are meanwhile fed from the cutter. As soon as the stack is in the position shown in Figure 2 the conveyor sprocket $O^8$ is lifted and the conveyor chain contacts the bottom of the stack and conveys the stack away for further disposition.

In the form of my invention shown in Figures 9 and 10 I substitute a side discharge which is adapted to remove the completed bundles laterally instead of longitudinally. I therefore provide the table W at the side of which are constantly driven a pair of sprocket chains. When a predetermined number of shingles has been discharged from the table W, it is depressed and the sprocket chains carry the completed bundle laterally from the machine. The vibrating arms Y tap each shingle up against the plate or stop X, thus maintaining a proper alignment in the bundle or stack. When the table W is depressed in response to the engagement of the roller $K^{32}$ with the cam face $K^{22}$ of the cam disk $K^{20}$, the lever $K^{38}$ is thrust forward to the position shown in dotted lines in Figure 9 and thrusts the supporting fingers $K^{51}$ out over the table W to receive the shingles which meanwhile are being constantly delivered when the table W again rises to receiving position as the roller $K^{32}$ rides up over the cam surface $K^{23}$, the lever $K^{38}$ is returned to its original position and the supporting fingers are withdrawn. The spring $K^{40}$ serves to aid in this return of the lever and to take the strain off the working parts.

It will be realized that while I have described and illustrated an operative device, I do not wish to be limited to the specific details therein shown. Many changes might be made in the size, shape, number, proportion and disposition of parts without departing from the spirit of my invention.

I claim:

1. A stacker for relatively thin articles comprising a receiving table and a conveyor and means for delivering the accumulation of articles being stacked upon said table to said conveyor when a predetermined number of articles has been received thereupon, and means for aligning said articles in a stack upon said table comprising in part a tapping element adapted to tap each article into place as it is delivered to said table, and means for raising said tapping element as the level of the top of the stack rises.

2. In a shingle stacker, a stacking element, means for feeding shingles successively to said element, and means for aligning said shingles on said stacking element to form an aligned stack comprising a tapping element adapted to tap each successive shingle into place, and a stop against which said shingles are aligned, and means for lifting said tapping element as the height of the top of the shingle stack rises.

3. In a shingle stacker, a stacking element, means for feeding shingles successively to said element, and means for aligning said shingles on said stacking element to form an aligned stack, comprising a stop against which said shingles are aligned, an oscillating bar, tapping elements mounted thereupon, and a driving connection adapted to oscillate said bar in response to the feed of shingles to said stack, and means for raising said bar successively in response to the successive feed of shingles to said stack.

4. In a shingle stacker, a stacking element, means for feeding shingles successively to said element, and means for aligning said shingles on said stacking element to form an aligned stack, comprising a tapping bar, tapping fingers mounted thereupon, a cam adapted to give said tapping fingers a tapping oscillation in response to each successive shingle fed to said stack and a cam adapted to lift said bar and fingers in response to the successive feed of shingles to said stack.

5. In a shingle stacker, a stacking element, means for feeding shingles successively to said element, and means for aligning said shingles on said stacking element to form an aligned stack, comprising a stop against which said shingles are aligned, an oscillating bar, tapping elements mounted thereupon, a driving connection adapted to oscillate said bar in response to the feed of shingles to said stack, means for raising said bar in response to the successive feed of shingles to said stack, and means for limiting the tapping excursion of said tapping fingers.

6. In a shingle stacker, a stacking element, means for feeding shingles successively to said element, and means for aligning said shingles on said stacking element to form an aligned stack, comprising a stop against which said shingles are aligned, an oscillating bar, tapping elements mounted thereupon, a driving connection adapted to oscillate said bar in response to the feed of shingles to said stack, means for raising said bar in response to the successive feed of shingles to said stack, and means for limiting the tapping excursion of said tapping fingers comprising a pin mounted on said bar and limit means adapted to limit the excursion of said pin in either direction.

7. In a stacker for relatively thin articles, a receiving table and a conveyor, means for feeding to said table a succession of the said articles, and means for delivering the accumulation of said articles to said conveyor, after a predetermined feed thereof, and means for aligning said articles in a stack upon said table, comprising in part a tapping element adapted to tap each article into place, and means for raising said tapping element as the level of the top of the stack rises.

8. A shingle stacker comprising in part a feed table adapted to receive in a horizontal position the successive shingle sections as they are delivered, and a shingle feed element adapted to engage the edge of each shingle and discharge it therefrom before the succeeding shingle is deposited thereupon.

9. A shingle stacker comprising in part a feed table adapted to receive in a horizontal position the successive shingle sections as they are delivered, and a shingle feed element adapted to engage the edge of each shingle and discharge it therefrom before the succeeding shingle is deposited thereupon, and a shingle stacking table adapted to receive the shingles successively so discharged.

10. A shingle stacker comprising in part a feed table adapted to receive in horizontal position the successive shingle sections as they are delivered, and a shingle feed element adapted to engage the edge of each shingle and discharge it therefrom before the succeeding shingle is deposited thereupon, comprising a feeding bar, and means for reciprocating it across the surface of said feed table.

11. In a stacker for relatively thin articles, a movable stacking table and means for delivering a succession of articles thereto, a conveyor, a supplemental receiving means adapted to be laterally moved into position above said table, and means for simultaneously changing the relative level of conveyor and table, and for moving said supplemental receiving means into position above said table, comprising a shaft and means for rotating it, a cam element on said shaft, a member adapted to be actuated thereby, and operative connections between said member and said table and between said member and said supplemental receiving means.

12. In a stacker for relatively thin articles, a movable stacking table and means for delivering a succession of articles thereto, a conveyor, a supplemental receiving means adapted to be laterally moved into position above said table, and means for simultaneously changing the relative level of conveyor and table, and for moving said supplemental receiving means into position above said table, comprising a shaft and means for rotating it, a cam element on said shaft, a lever positioned in opposition to said cam, a connection between one arm of said lever and said table, and a connection between the other arm of said lever and the supplemental receiving means.

13. In a stacker for relatively thin articles, a movable stacking table and means for delivering a succession of articles thereto, a conveyor, a supplemental receiving means adapted to be laterally moved into position above said table, and means for simultaneously changing the relative level of conveyor and table, and for moving said supplemental receiving means into position above said table, comprising a shaft and means for rotating it, a cam element on said shaft, a lever positioned in opposition to said cam, a connection between one arm of said lever and said table, a lever controlling said supplemental receiving means, a connection between said lever and the cam controlled lever, 14. In a stacker for relatively thin articles, a movable stacking table and means for delivering a succession of articles thereto, a conveyor, a supplemental receiving means adapted to be laterally moved into position above said table, and means for simultaneously changing the relative level of conveyor and table, and for moving said supplemental receiving means into position above said table, comprising a shaft and means for rotating it, a cam element on said shaft, a member adapted to be actuated thereby, and operative connections between said member and said table and between said member and said supplemental receiving means, and yielding means for normally holding the lever controlling the supplemental receiving means in withdrawn position.

15. In a stacker for relatively thin articles, a receiving table and a conveyor adjacent thereto, but spaced therefrom, means for feeding to said table a succession of said articles, and means for delivering the accumulation of said articles to said conveyor, after a predetermined feed thereof, comprising means for moving said stack to overlie said conveyor, and for at the same time lifting said conveyor to engage the stack of articles accumulated on said table.

16. In a stacker for relatively thin articles, a receiving table and a conveyor adjacent thereto, but laterally spaced therefrom, means for feeding to said table a succession of said articles, and means for delivering the accumulation of said articles to said conveyor, after a predetermined feed thereof, comprising means for laterally moving said stack to overlie said conveyor, and for at the same time lifting said conveyor to engage the stack.

17. In a stacker for relatively thin articles, a receiving table and a conveyor adjacent thereto, but laterally spaced therefrom, means for feeding to said table a succession of said articles, and means for delivering the accumulation of said articles to said conveyor, after a predetermined accumulation of said articles upon said table, after a predetermined feed thereof, comprising means for laterally moving said stack and positioning it upon said conveyor.

18. In a stacker for relatively thin articles, a feed table, and means for feeding a timed succession of said articles thereto, a feed element adapted successively to discharge therefrom the articles deposited thereupon, a receiving table adapted to receive the articles so discharged, an endless conveyor, and means for depositing upon said endless conveyor the articles accumulated upon said receiving table after the feed thereto of a predetermined number.

19. In a stacker for relatively thin articles, a feed table, and means for feeding a timed succession of said articles thereto, a feed element adapted successively to discharge therefrom the articles deposited thereupon, a receiving table adapted to receive the articles so discharged, an endless conveyor, and means for depositing upon said endless conveyor the articles accumulated upon said receiving table after the feed thereto of a predetermined number, comprising means for laterally moving said stack and positioning it upon said conveyor.

20. In a stacker for relatively thin articles, a feed table, and means for feeding a timed succession of said articles thereto, a feed element adapted successively to discharge therefrom the articles deposited thereupon, a receiving table adapted to receive the articles so discharged, an endless conveyor, and means for depositing upon said endless conveyor the articles accumulated upon said receiving table after the feed thereto of a predetermined number, comprising means for laterally moving said table to overlie said conveyor and for at the same time lifting said conveyor in relation to said table.

21. In a stacker for relatively thin articles, a receiving table and a conveyor adjacent thereto, but laterally spaced therefrom, means for feeding to said table a succession of said articles, and means for delivering the accumulation of said articles to said conveyor, after a predetermined feed thereof, comprising means for laterally moving said stack to overlie said conveyor, and for at the same time lifting said conveyor to engage the stack, and a supplemental table, structurally integral with the receiving table, adapted to be positioned in the normal location of the receiving table during such lateral movement of the receiving table.

22. In a stacker for relatively thin articles, a receiving table and a conveyor adjacent thereto, but laterally spaced therefrom, means for feeding to said table a succession of said articles, and means for delivering the accumulation of said articles to said conveyor, after a predetermined feed thereof, comprising means for laterally moving said stack to overlie said conveyor, and for at the same time lifting said conveyor to engage the stack, and a supplemental table, structurally integral with the receiving table, adapted to be positioned in the normal location of the receiving table by and during such lateral movement of the receiving table, and to receive the articles fed during the lateral excursion of the receiving table.

23. In a stacker for relatively thin articles, a feed table, and means for feeding thereto in timed succession the articles being stacked, a feed element, and means for reciprocating it across the surface of said table to discharge therefrom, as they are deposited thereupon, the articles fed thereto, a receiving table adapted to receive the articles discharged by such feed element, an endless conveyor, and means for depositing upon said conveyor the stack of articles accumulated upon said receiving table after the feed thereto of a predetermined number.

Signed at Chicago, county of Cook and State of Illinois, this 22nd day of August 1923.

HUGO REICHEL.